United States Patent
Boyer et al.

(10) Patent No.: US 8,095,574 B2
(45) Date of Patent: Jan. 10, 2012

(54) DYNAMICALLY MAPPING AND MAINTAINING A CUSTOMIZED METHOD SET OF TAGS PARTICULAR TO AN EXTENTION POINT

(75) Inventors: John E. Boyer, Seattle, WA (US); Edward E. Kelley, Wappingers Falls, NY (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/183,625

(22) Filed: Jul. 31, 2008

(65) Prior Publication Data

US 2010/0031160 A1 Feb. 4, 2010

(51) Int. Cl.
*G06F 17/30* (2006.01)
(52) U.S. Cl. .................................................... 707/805
(58) Field of Classification Search .................. 707/736, 707/776, 805
See application file for complete search history.

(56) References Cited

U.S. PATENT DOCUMENTS

| | | | |
|---|---|---|---|
| 7,668,821 B1 * | 2/2010 | Donsbach et al. | 707/765 |
| 7,818,344 B2 * | 10/2010 | McVeigh et al. | 707/786 |
| 7,840,549 B2 * | 11/2010 | Bailey et al. | 707/711 |
| 2006/0036679 A1 * | 2/2006 | Goodman et al. | 709/203 |
| 2006/0123337 A1 * | 6/2006 | Koinuma | 715/530 |
| 2006/0259462 A1 * | 11/2006 | Timmons | 707/3 |
| 2007/0016575 A1 * | 1/2007 | Hurst-Hiller et al. | 707/5 |
| 2007/0083894 A1 * | 4/2007 | Gonsalves et al. | 725/46 |
| 2007/0100844 A1 * | 5/2007 | Buttner et al. | 707/100 |
| 2007/0208751 A1 * | 9/2007 | Cowan et al. | 707/10 |
| 2008/0010249 A1 * | 1/2008 | Curtis et al. | 707/3 |
| 2008/0263103 A1 * | 10/2008 | McGregor et al. | 707/200 |

* cited by examiner

*Primary Examiner* — James Trujillo
*Assistant Examiner* — Jorge A Casanova
(74) *Attorney, Agent, or Firm* — Cantor Colburn LLP

(57) ABSTRACT

A method for consistently and dynamically mapping and maintaining a customized method set of tags particular to an extension point page, includes: extending static customized method content to the extension point page by: mapping static customized method content to an extension point page; wherein the extension point page is configured with collaborative content and dynamic content; filtering the dynamic content based on a set of tags associated with the extension point page; synchronizing the extension point page's tags to ensure that the dynamic content rendered in the extension point page has a set of updated tags to retrieve current syndicated content; wherein a method author defines the extension point page in the customized method; and wherein a method user views the extension point page.

17 Claims, 13 Drawing Sheets

DYNAMICALLY MAPPING AND MAINTAINING A CUSTOMIZED METHOD SET OF TAGS PARTICULAR TO AN EXTENTION POINT

BACKGROUND

This invention relates generally to service oriented architectures, and more particularly to a system, article, and method for consistently and dynamically mapping and maintaining a customized method set of tags particular to an extension point.

Service Oriented Architecture (SOA) is a development of distributed computing and modular programming in which existing or new technologies are grouped into autonomic systems. SOAs employ software services to build applications. Services are relatively large, intrinsically unassociated units of functionality with externalized service descriptions. SOAs typically implement functionalities most humans would recognize as a service, such as filling out an online application for an account, viewing an online bank statement, or placing an online booking or airline ticket order. Thus, SOA serves to align business and information technology (IT).

In an SOA environment, instead of services embedding calls to each other in their source code, protocols are defined that describe how one or more services may talk to each other. In an SOA environment, one or more services communicate with one another by passing data from one service to another, or coordinate an activity between one or more services. In addition, independent services may be accessed without the knowledge of the underlying platform implementation. In this manner, autonomic services may be orchestrated into higher-level services. In SOA, the application architecture has all its functions and services defined using a description language having invokable interfaces that are called to perform business processes. In SOA, each interaction is independent of each and every other interaction, and the interconnect protocols of the communicating devices (i.e., the infrastructure components that determine the communication system do not affect the interfaces). Because interfaces are platform-independent, a client from any device using any operating system in any language may use the service.

A current challenge in SOA development is to build business driven composite services atop of autonomic informational services. By defining a methodology for the use and re-use of software services and business processes, which typically encompass multiple service invocations, SOA has the potential to provide a great deal of flexibility and cost savings to enterprises that rely on information technology (IT).

The SOA concept is based upon an architectural style that defines an interaction model between three primary building blocks: a) a service provider, which publishes a service description and provides the implementation for the service; b) a service requester, which can either use the uniform resource identifier (URI) for the service description directly, or find the service description in a service registry and bind and invoke the service; and c) a service broker, which provides and maintains the service registry using, for example, the Universal Description Discovery and Integration (UDDI) specification, which defines a way to publish and discover information about web services.

A web service is a software application designed to support interoperable machine-to-machine interaction over a network, and is frequently simple web application program interfaces (API) that may be accessed over a network, such as the Internet, and executed on a remote system hosting the requested services. Web services may provide an example of an SOA implementation in which the basic unit of communication is a message, rather than an operation, by making functional building blocks accessible over standard Internet protocols that are independent from platforms and programming languages.

"Web 2.0" is a term that refers to an increasingly frequented type of web application that is primarily distinguished by the ability of visitors to continually contribute information for collaboration and sharing. Web 2.0 applications use web services, and may include composite user interfaces that provide combinations of various service technologies such as collaborative and social software, web syndication, weblogs, and wikis. While there are no set standards for Web 2.0, Web 2.0 is a user-driven architecture of participation that utilizes the SOA characteristics of building on the existing architecture and using services. The evolving technology infrastructure of Web 2.0 includes various applications that may provide users with information storage, creation, and dissemination capabilities that go beyond what had formerly been expected of web applications.

A number of Web 2.0 applications feature the extensive use of folksonomies. A folksonomy involves the practice of collaborative categorization using freely-chosen tags, that is, metadata in the form of descriptive keywords or terms associated with or assigned to a piece of information, and arises in web applications in which special provisions are made at the site level for creating and using tags for web content. Collaborative tagging in this fashion is intended to enable a body of information to be increasingly easy to search, discover, and navigate over time, and folksonomies are commonly used to label, classify, and retrieve web content such as web pages, digital images, Internet bookmarks, and web links. As folksonomies develop in web-mediated social environments, users often discover the tag sets of another user who tends to interpret and tag content in a way that makes sense to them. The use of folksonomies may result in an immediate and rewarding gain in user capacity to find related content.

Flickr and del.icio.us are examples of websites that use folksonomic tagging to organize content. Flickr is a digital image storage and management service that is configured with a user interface, to tag images with descriptive nouns, verbs, and adjectives, and systematically perform CRUD (create, read, update, and delete) operations on photography entries del.icio.us is a social bookmarking site that is configured for users to create and store Internet bookmarks, and then tag the bookmarks with many descriptive words, facilitating others to search by those terms to find sites that have been found useful.

Within the realm of a business enterprise and its network of partners, there are numerous opportunities for collaboration. The use of Web 2.0 technologies and SOA principles has the potential to increase the reach and improve the richness of this interaction in enterprise informational services, leading to more efficient development of new business models and processes by using readily available, intuitive modular elements. By creating an environment in which employees can collaborate efficiently, by leveraging each other's intellect and resources, employees can create stronger and more successful products. Nevertheless, most software that is touted as enabling enterprise collaboration is difficult to use, cumbersome, and does not adequately empower employees to share their content. This results in SOA implementations that undesirably add more custom logic and increased complexity to an IT infrastructure. A big hurdle for the typical large enterprise is the ability to standardize knowledge practice across that enterprise, and to implement tools and processes that support that aim.

An example of an enterprise or business-driven collaborative enterprise environment is that of a composite service system. A composite service system comprises a collection of collaborative or interactive services, which aggregate domain-specific (or context-aware) content information that may be utilized by employees to maintain consistency across all of the enterprise informational services. Examples of systems that may be implemented in this fashion include project management systems, which are used to schedule, track, and chart the steps in a project as it is being completed, workflow systems, which enable the collaborative management of tasks and documents within a knowledge-based business process, and knowledge management systems, which are used to collect, organize, manage, and share various forms of information. Operations such as record management, content management, collaborative software, workflow or business process management, and other mechanisms designed to capture the efforts of many into a managed content environment are typical of these workplace collaboration technologies.

Domain knowledge is the body of knowledge about a particular activity environment. In an enterprise, domain knowledge has traditionally been organized (formally or informally) in an institutionally supported taxonomy that is domain-specific. Domain knowledge may be kept in data repositories such as Lotus Notes Teamrooms, ad-hoc websites, knowledgebases, social bookmarks, or applications, and so on. A workplace-generated folksonomy would be useful, for example, with business-driven collaborative or interactive management systems of composite services that are designed to help employees working on a common task achieve their goals.

Internet resource identifiers such as uniform resource identifiers (URIs), uniform resource locators (URLs), or internationalized resource identifiers (IRIs) are internet addresses that implement a variety of naming schemes and access methods, such as Hypertext Transfer Protocol (HTTP) and File Transfer Protocol (FTP). The primary purpose of Internet resource identifiers (URIs, URLs, and IRIs) is to identify resources on the web, such as documents, images, files, services media, applications, and other resources.

SUMMARY

Embodiments of the present invention include a method, article, and system for consistently and dynamically mapping and maintaining a customized method set of tags particular to the extension point page, the method includes: extending static customized method content to the extension point page by: mapping static customized method content to the extension point page; wherein the extension point page is configured with collaborative content and dynamic content; filtering the dynamic content based on a set of tags associated with the extension point page; synchronizing the extension point page's tags to ensure that the dynamic content rendered in the extension point page has a set of updated tags to retrieve current syndicated content; wherein a method author defines the extension point page in the customized method; and wherein a method user views the extension point page.

An article comprising one or more computer-readable storage media containing instructions that when executed by a computer enables a method for consistent and dynamic mapping and maintenance of a customized method set of tags particular to an extension point page, the method includes: extending static customized method content to the extension point page by: mapping static customized method content to the extension point page; wherein the extension point page is configured with collaborative content and dynamic content; filtering the dynamic content based on a set of tags associated with the extension point page; synchronizing the extension point page's tags to ensure that the dynamic content rendered in the extension point page has a set of updated tags to retrieve current syndicated content; wherein a method author defines the extension point page in the customized method; and wherein a method user views the extension point page.

A system for consistent and dynamic mapping and maintenance of a customized method set of tags particular to an extension point page, the system includes: one or more server devices in communication with one or more client devices through a network; the server devices and the client devices configured to execute electronic software; wherein the electronic software is resident on storage mediums in signal communication with the client and server devices; wherein the electronic software comprises a series of instructions configured for: extending static customized method content to the extension point page by: mapping static customized method content to the extension point page; wherein the extension point page is configured with collaborative content and dynamic content; filtering the dynamic content based on a set of tags associated with the extension point page; synchronizing the extension point page's tags to ensure that the dynamic content rendered in the extension point page has a set of updated tags to retrieve current syndicated content; wherein a method author defines the extension point page in the customized method; and wherein a method user views the extension point page.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
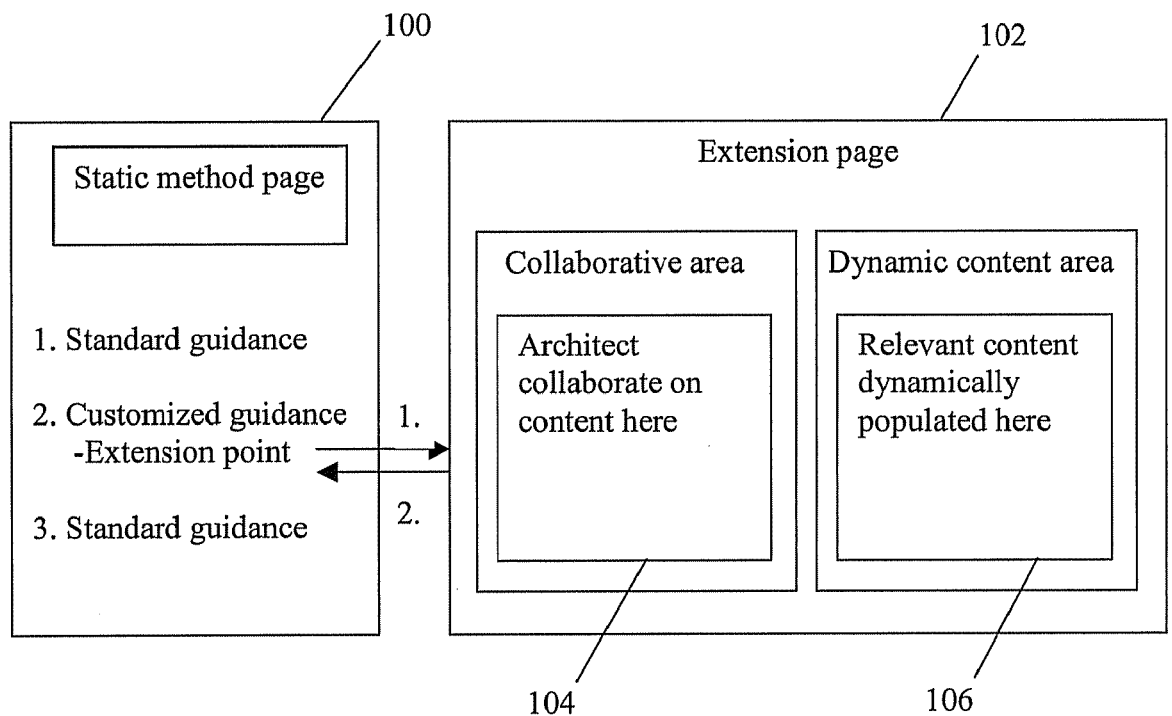
FIG. 1 is a block diagram illustrating an extension of static (read-only) customized method content to an extension page with collaborative and dynamic content, according to embodiments of the invention.
Figure 2:
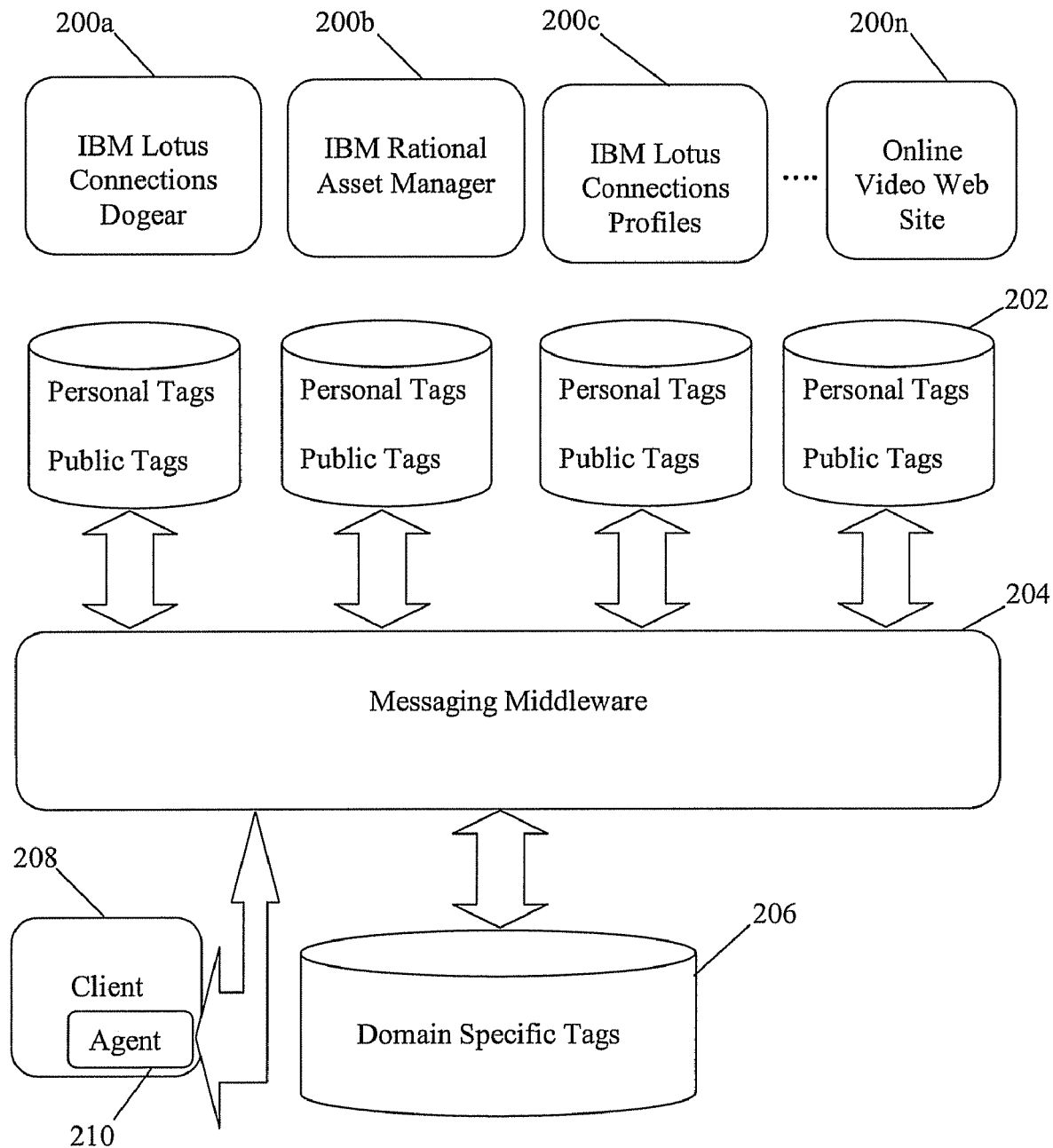
FIG. 2 is a block diagram that illustrates the maintaining of consistency of domain-specific tags across informational silos with disparate folksonomies according to embodiments of the invention.

Embodiments of the invention provide a method, article, and system for consistently and dynamically mapping and maintaining customized method set of tags particular to an extension point. FIG. 1 is a block diagram illustrating an extension of static (read-only) customized method content 100 to an extension point page 102 with collaborative 104 and dynamic content 106, according to embodiments of the invention. Collaborative content refers to Web pages configured to allow multiple authors to contribute and edit the Web page's content. For example, a wiki is a collaborative website that contains a collection of editable web pages. Dynamic content refers to content that is provided via Web feeds. In embodiments of the invention, each extension point page 102 maps to an extension point in the static customized method content 100, and dynamic content is filtered based on the set of tags associated with the extension point. In embodiments of the invention, as illustrated in FIG. 2, the consistency of domain-specific tags 206 across informational silos (200a-200n) is maintained despite disparate folksonomies via messaging middleware 204 that generates tags 202 for the informational silos 200. The client 208 is typically any kind of client that is used to access web 2.0 aware applications. A typical client 208 is web browsing software such as Firefox or Internet Explorer. The client 208 renders static and dynamic content realized with embodiments of the invention. The agent 210 is a piece of software (such as a plugin, add-on, extension, etc.) that is responsible for maintaining the consistency of a tag for a particular user of a particular community of practice (COP).

Figure 4:
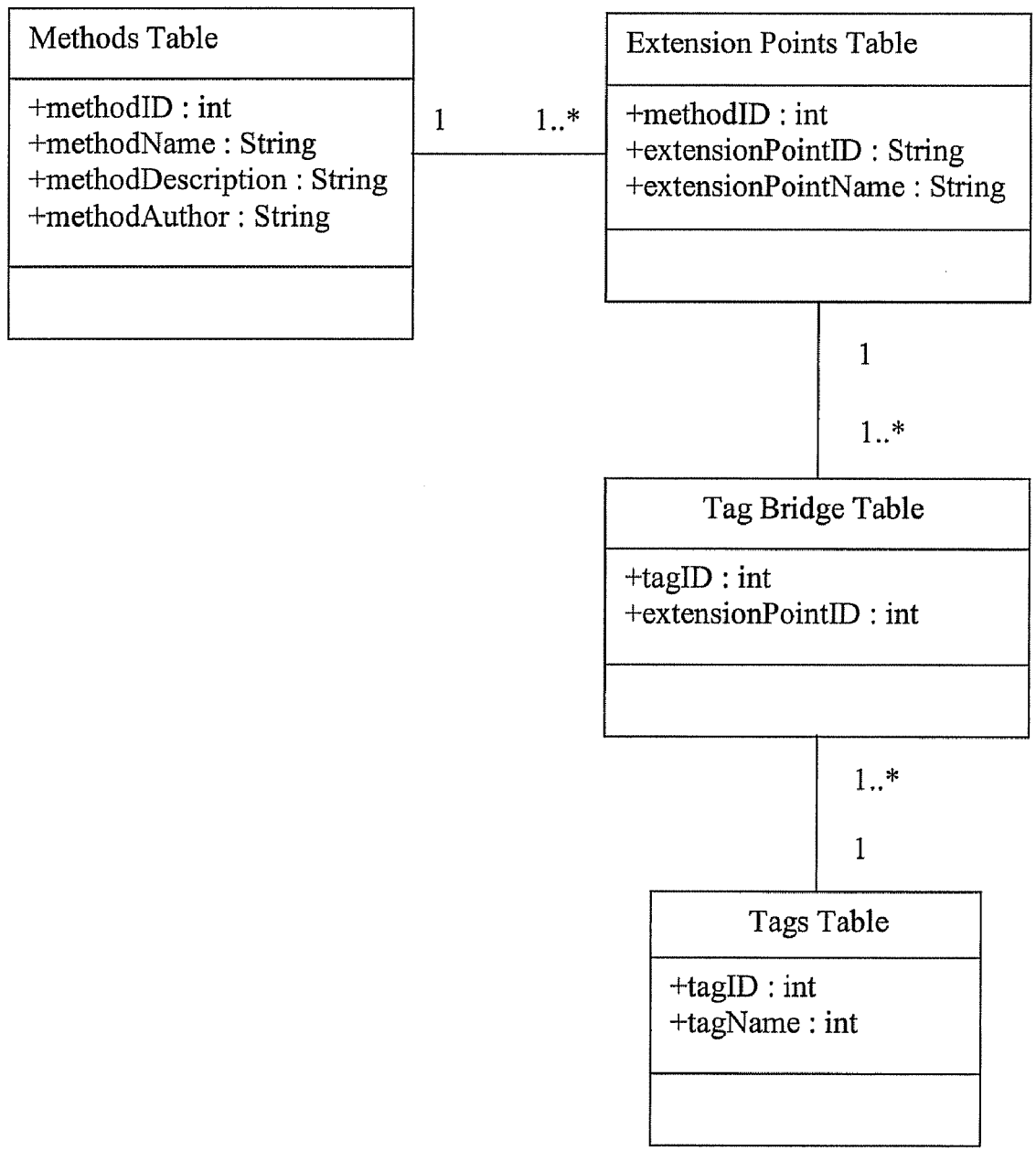
FIG. 4 illustrates a data model for updating a tag management database according to embodiments of the invention.

Embodiments of the invention synchronize an extension point's tags in the event the tags have changed. Embodiments of the invention ensure that dynamic information that is rendered in an extension point page has updated tags to retrieve the most current syndicated content. The tags are synchronized through an application, or Web service, that updates a relational database management system (RDBMS). FIG. 4 illustrates an exemplary data model for updating an RDBMS.

Figure 3A:
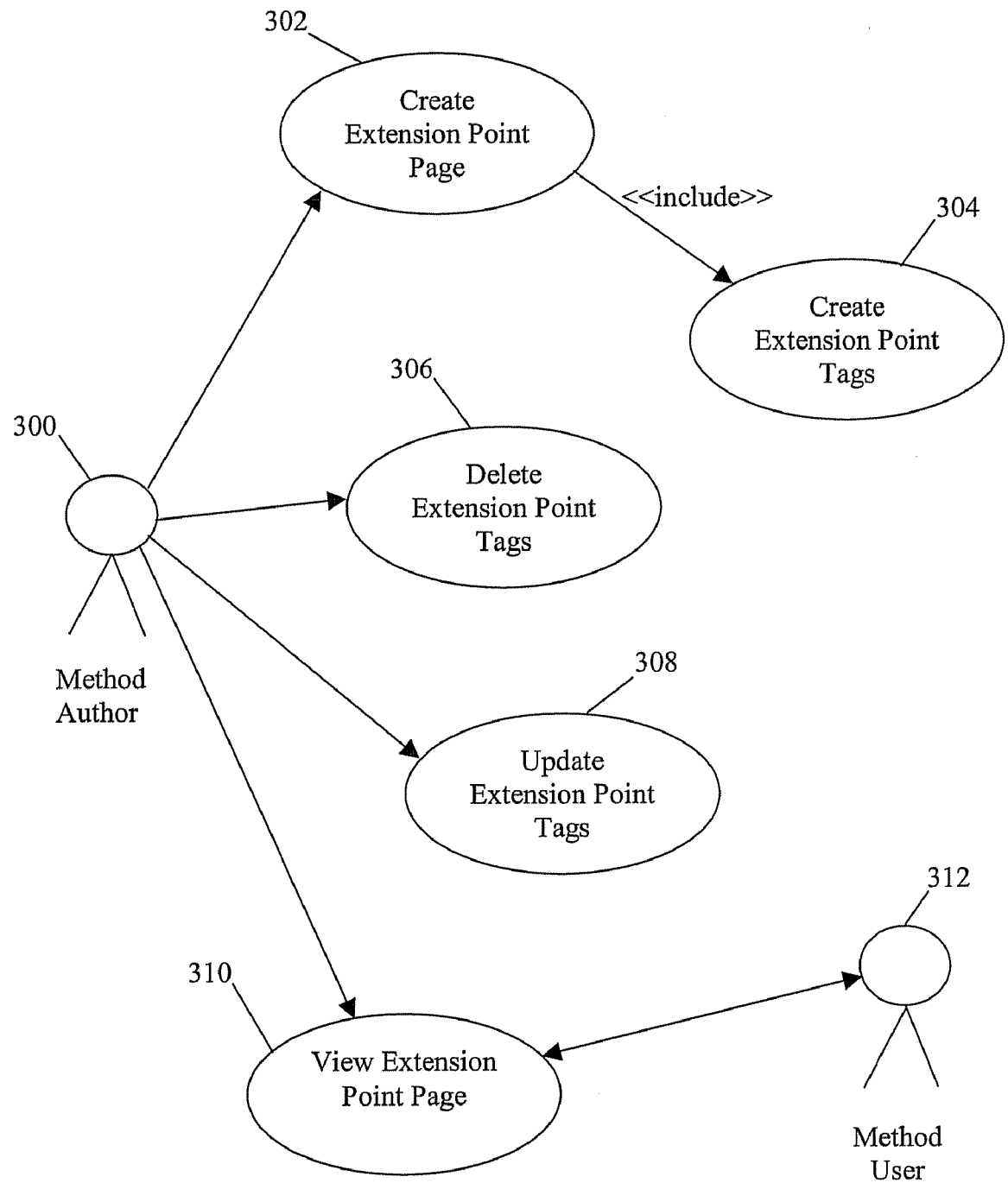
FIG. 3A is a functional block diagram illustrating five use cases by a method author and method user according to embodiments of the invention.

Embodiments of the invention have two primary actors a method author, and a method user, who are depicted as 300 and 312, respectively in FIG. 3A. The method author 300 is a person who defines the extension points in the customized method (also referred to as a process author). The method user 312 is a person who views the extension point pages.

FIG. 3A is a functional block diagram illustrating five use cases by a method author and method user according to embodiments of the invention. In embodiments of the invention, in the event a method user 312 encounters an extension point in a method, the method user 312 selects (or clicks on) a corresponding extension point link, and opens (creates) an extension point page 302. In a background process, a Web service is automatically called to provide (create) extension point tags 304 for the extension point page 302. Subsequently, the extension point page 302 is rendered with dynamic content associated with the extension point tags 304, which are a subset of the customized (static) method tags. Embodiments of the invention provide a coherent way of managing the extension point tags, and dynamically map an extension point to the latest up to date extension point tags to ensure that the dynamic information retrieved is of a high quality. A consistent set of domain based tags, returned for a customized (static) method, ensures that dynamic context returns, from the various informational silos repositories (bookmarks, assets, media, blogs etc.) will be of a consistent high quality.

Table 1 is an exemplary representation of a mapping of tags to extension points that is maintained by a customized method author. In embodiments of the invention, the customized method author keeps the table up to date (current), and removes tags as necessary. It is noted that the tags in the table are just soft references to the actual tags that have been identified and maintained for a particular customized method. By employing soft references, this ensures in the event a particular tag is renamed or modified, that the updated tag name is reflected in the table immediately, thereby allowing for consistency in terms of quality of the dynamic information being provided to the end user of customized method

TABLE 1

| Extension points | Tags |
| --- | --- |
| Extension point 1 | tag3, tag9, tag12 |
| Extension point 2 | tag2, tag3, tag11, tag14 |
| Extension point 3 | tag2, tag12 |
| ... | ... |
| Extension point n | ... |

In embodiments of the invention, an informational service (Web service) may be built around the table to facilitate a user to create, read, update, and delete (CRUD) table information. For example, in a read operation there are two parameters passed in a call function; 1) a unique identifier for a particular customized method, with each separate customized method having a unique table, 2) an identifier identifying a particular extension point—for example:
readTagsForExtensionPoint(customizedMethodID:String, extensionPointID:String)::Tag[ ]
where Tag[ ] is a collection of tagging instances.

This method could then be called from within the extension page corresponding to the extension point to pre-populate the latest tags needed for this particular extension point, and use these tags in the corresponding RSS (really simple syndication) call to the various informational silos. The method just described could be done using AJAX or ASAN.

A separate area of the collaborative Web site (wiki) would provide dynamic content relevant to an architect for this particular extension point, in the form of RSS or atom feeds. In the case of a service identification extension, the separate area would be populated by dynamic content around the service identification. Examples of dynamic content are:

Bookmarks—subject matter expert of service identification (including their instant messaging status)

Reusable assets from an asset repository (including documentation, patterns, and even tooling for services identification)

Media rich content (including technical presentations, movies, or podcasts)

Educational content (including blogs, course material, other reading material, red books, etc.)

Social software services

Wikis, and finally provides

Activities that the architect is required to follow to complete the extension point around service identification in a successful manner.

Returning to FIG. 3A, the method author 300 may also delete extension point tags 306, update extension point tags 308, and view extension point pages 310 with the method user 312.

FIGS. 3B-3E are flow diagrams illustrating the process flow for each of the five use cases according to embodiments of the invention.

Figure 3B:
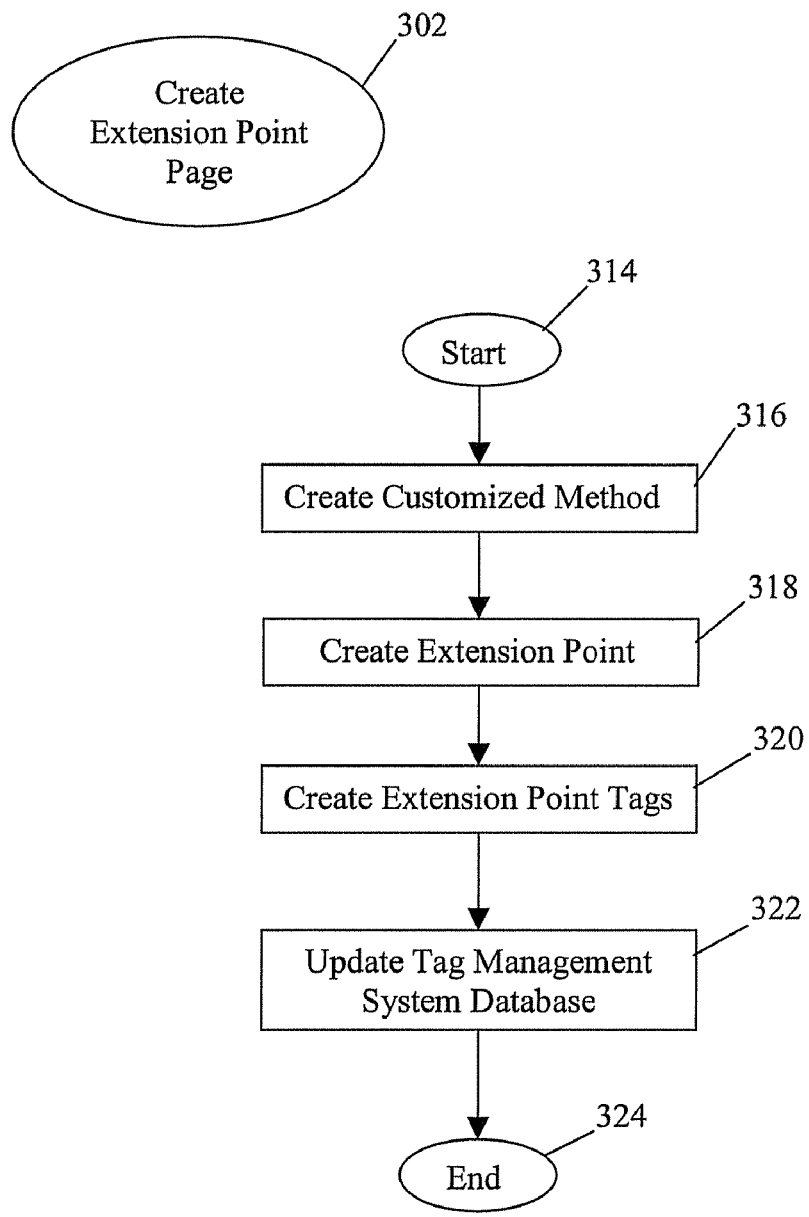
FIGS. 3B-3E are flow diagrams illustrating the process flow for each of the five use cases according to embodiments of the invention.

In FIG. 3B, the method author 300 creates an extension point page 302 by the following process. The process starts (block 314) with the creation of a customized method (block 316), creation of an extension point (block 316), and a subsequent update of the tag management system database (block 322), and the process concludes (block 324).

Figure 3C:
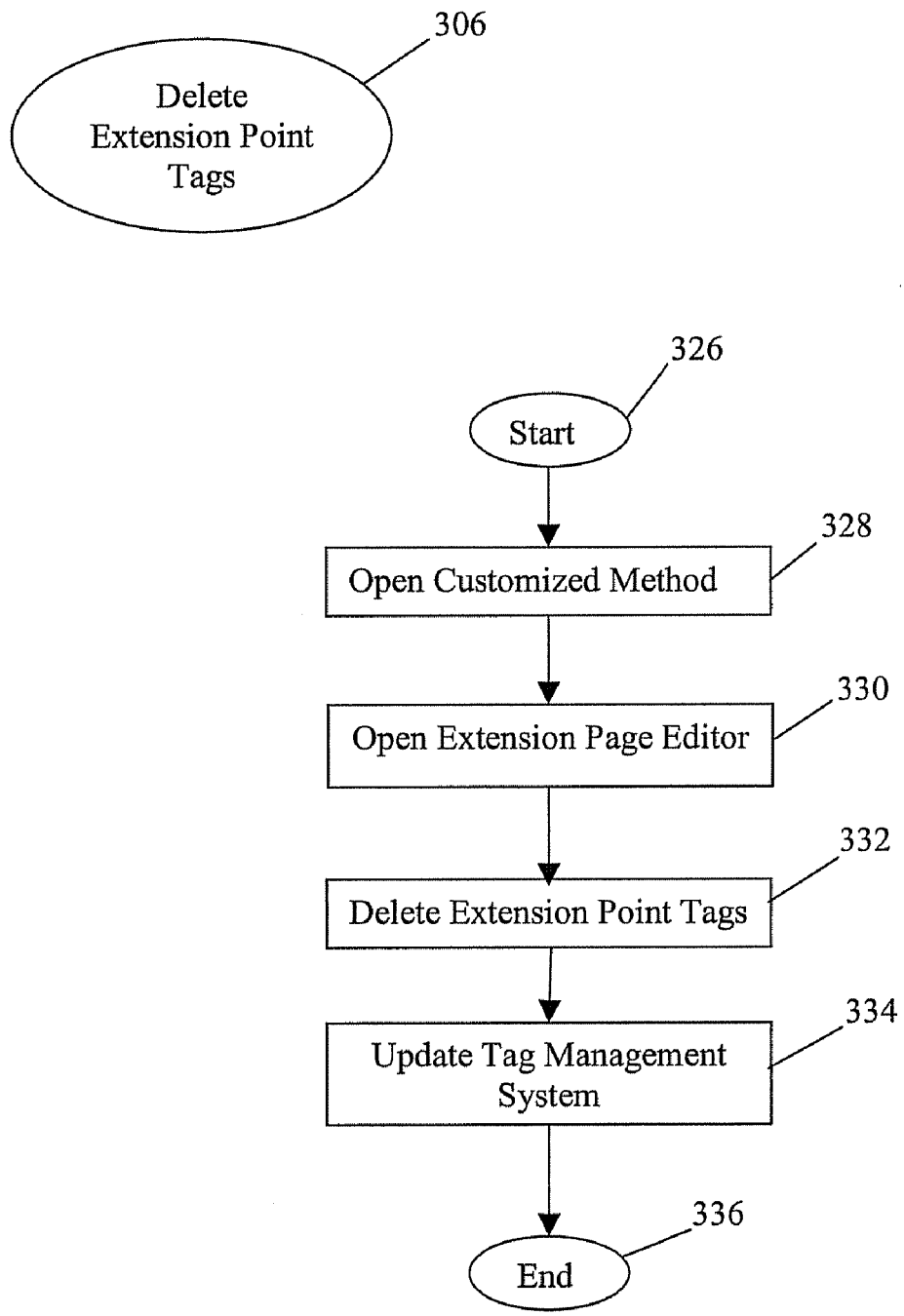

In FIG. 3C, the method author 300 deletes an extension point tag 306 by the following process. The process starts (block 326) by opening a customized method (block 328) and an extension page editor (block 330), and deleting extension point tags (block 332). Subsequently, the tag management system database is updated (block 324), and the process concludes (block 336).

Figure 3D:
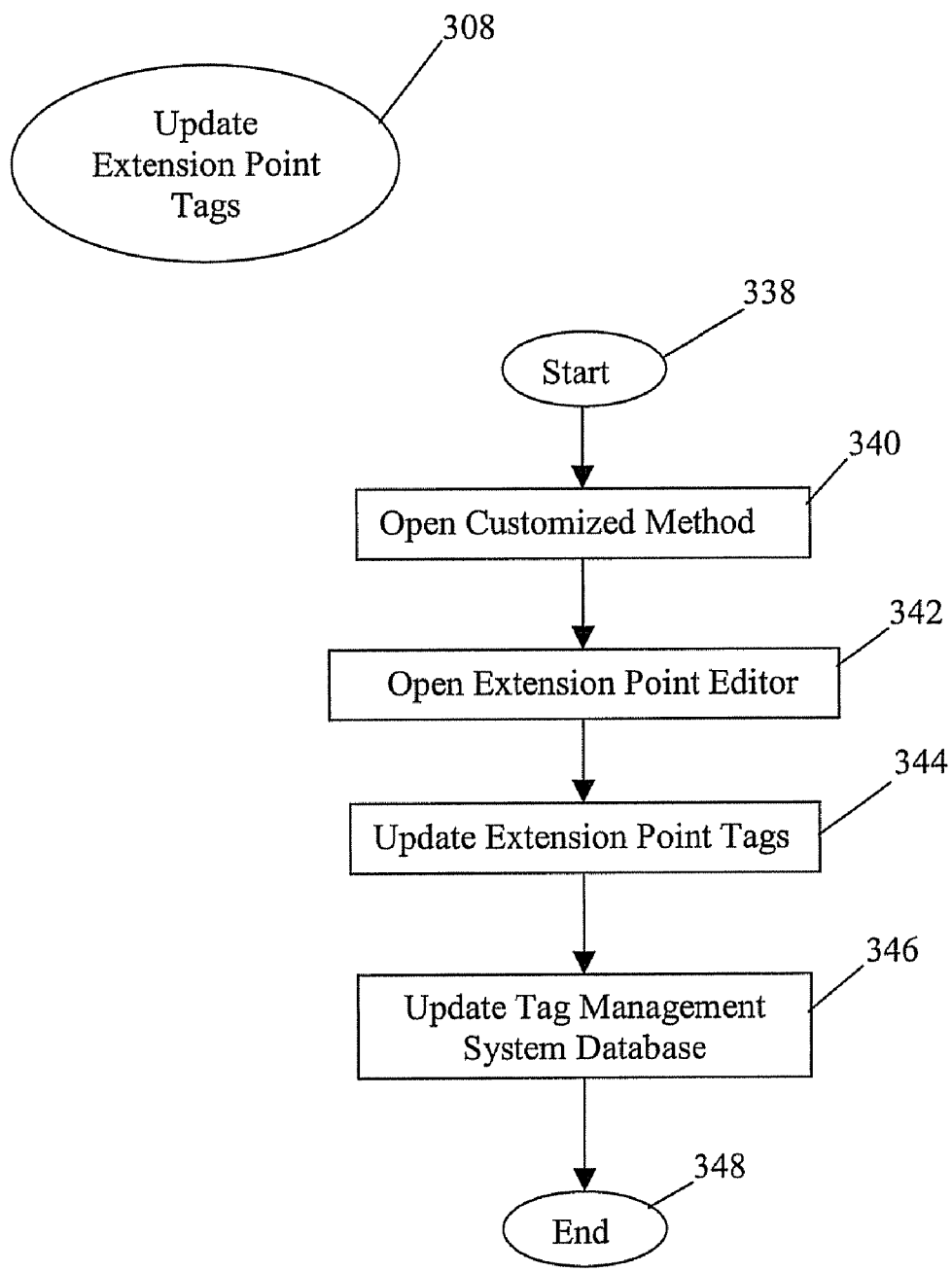

In FIG. 3D, the method author 300 updates an extension point tag 308 by the following process. The process starts (block 338) by opening a customized method (block 340) and an extension point editor (block 342), and updating extension point tags (block 344). Subsequently, the tag management system database is updated (block 346), and the process concludes (block 348).

Figure 3E:
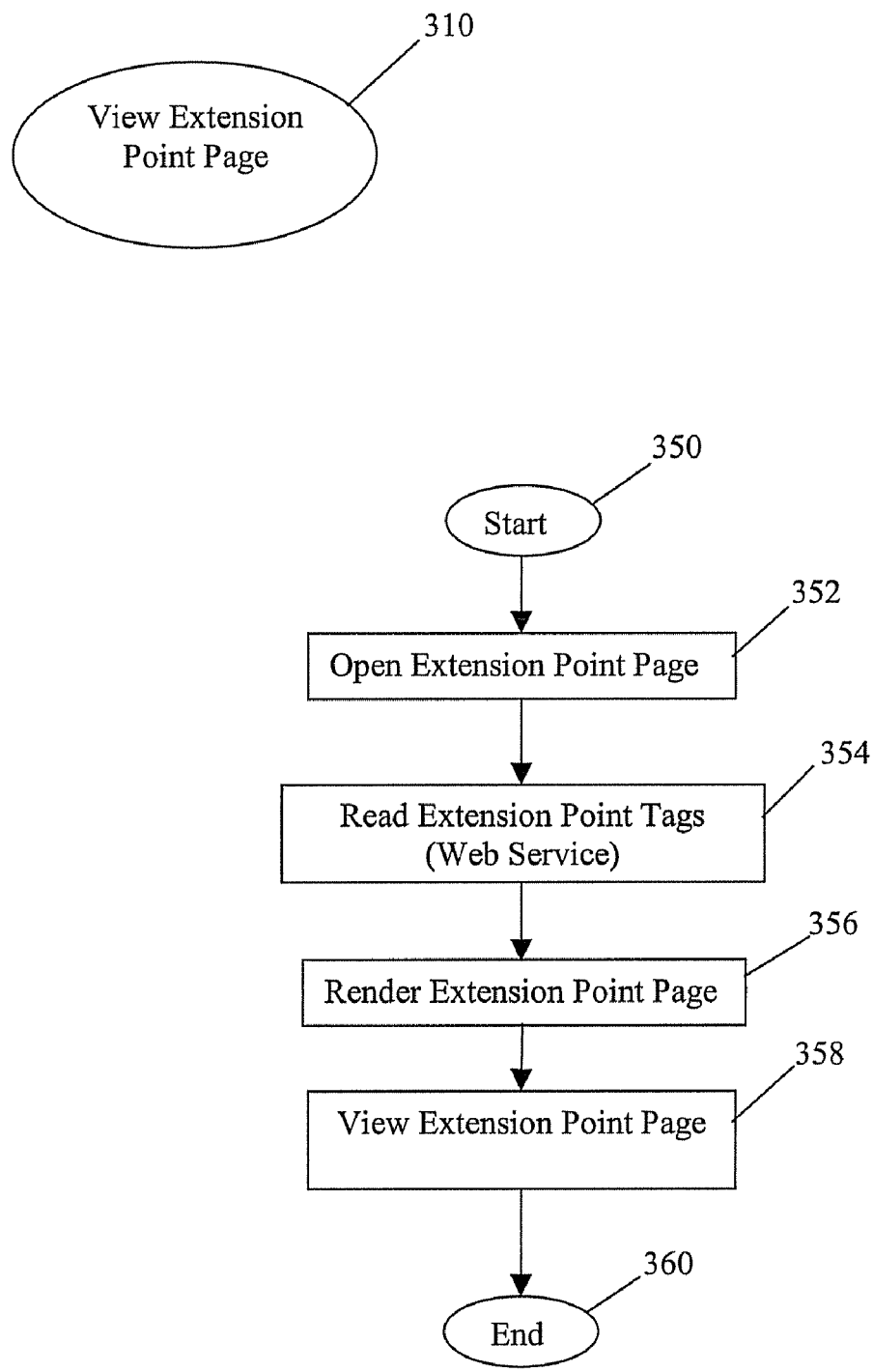

In FIG. 3E, the method author 300 or method user 312 views an extension point page 310 by the following process. The process starts (block 390) by opening an extension point page (block 392), and a Web service reads an extension point tag (block 394), and renders an extension point page (block 396). Subsequently, the extension point page is available for viewing (block 398), and the process concludes (block 360).

Figure 5:
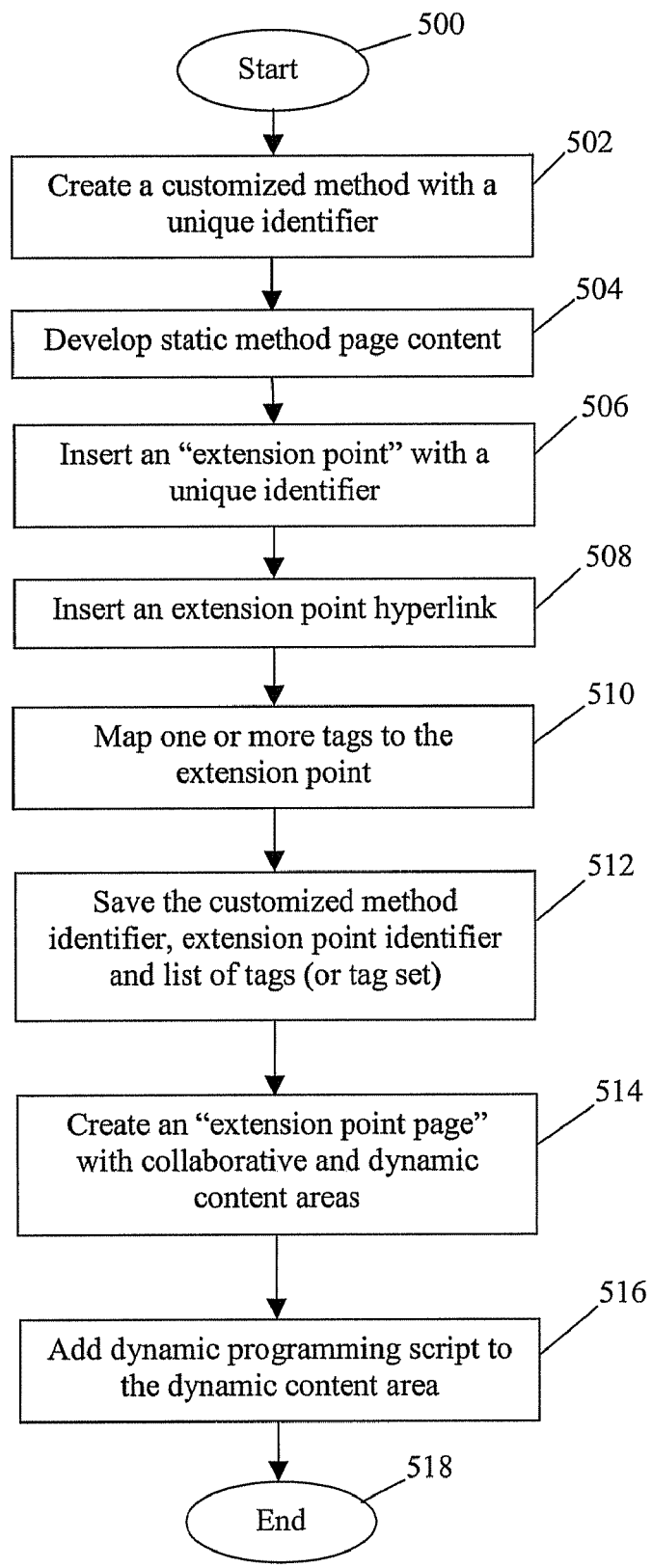
FIG. 5 is a detailed process flowchart for creating extension point tags from a method author's perspective according to embodiments of the invention.

FIG. 5 is a detailed process flowchart for creating extension point tags from a method author's perspective according to embodiments of the invention. The process starts (block 500) with the creation of a customized method by the method author, and a system embodiment assigning a unique identifier (block 502). The method author develops static method content for a particular page of the customized method (block 504), and inserts an extension point, to which the system will assign a unique identifier (block 506). It is noted that the method author has added an extension point because the page will require further customized guidance. A system generated extension point hyperlink or Uniform Resource Identifier (URI) is then inserted into the customized method (block 508). The method author maps one or more tags to the extension point, referred to as a set of tags or extension point tags (block 510). The method author saves the customized method identifier, extension point identifier, and the set of tags to the system database (block 512) (see FIG. 4). The method author subsequently creates an extension point page with collaborative and dynamic content areas (block 514) (see FIG. 1). In addition, the system embodiment generates dynamic programming script such as AJAX (Asynchronous Javascript and XML), so that method users will be able to view the current syndicated content associated with the extension point's set of tags (block 516), and the process concludes (block 518).

Figure 6:
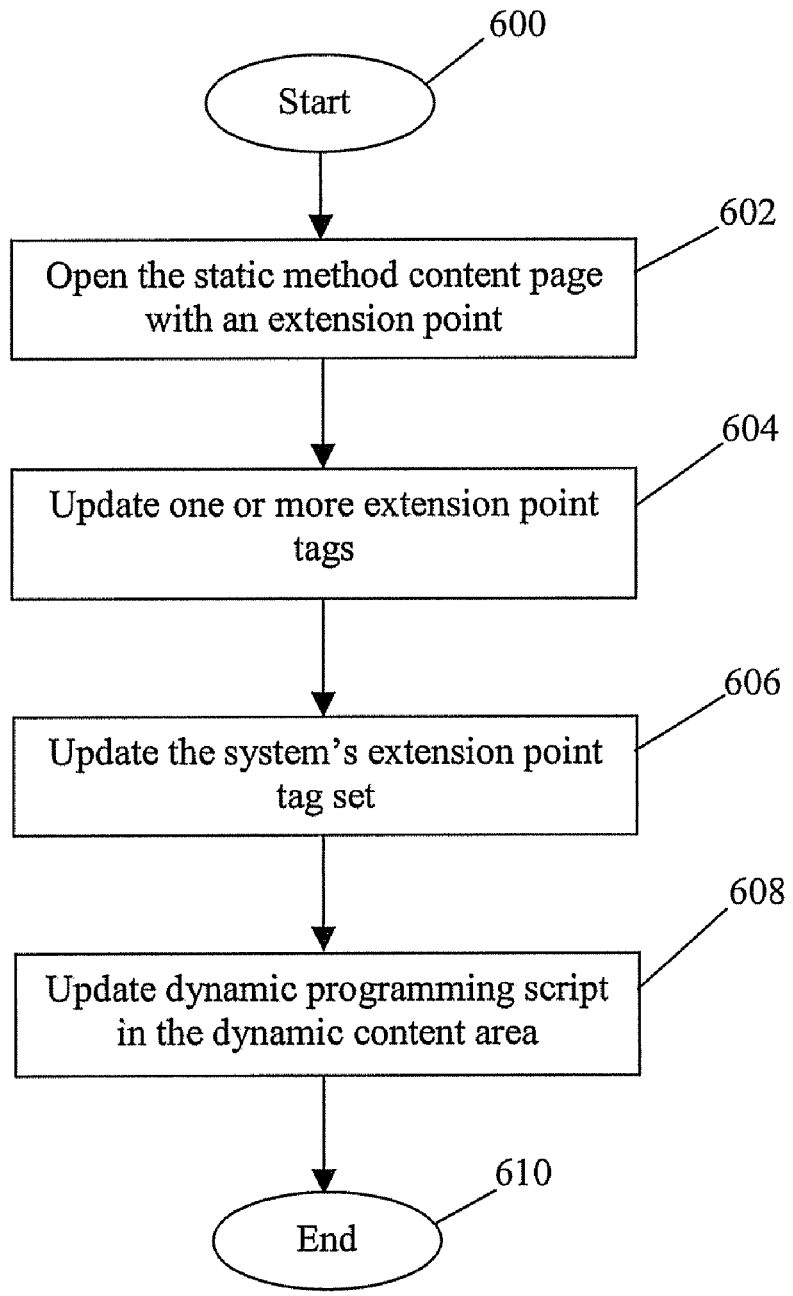
FIG. 6 is a detailed process flowchart for revising extension point tags from a method author's perspective according to embodiments of the invention.

FIG. 6 is a detailed process flowchart for revising extension point tags from a method author's perspective according to embodiments of the invention. The process begins (block 600) with a method author opining the static method content page that contains an extension point (block 602). The method author revises (updates) one or more of the extension point's tags (block 604). During the revision, the method author will update the set of tags associated with the extension point by either changing or removing tags from the extension point's tag set. The method author updates extension point's set of tags in the system database (block 606) (see FIG. 4). In response, the system embodiment regenerates the dynamic programming script such as AJAX (Asynchronous Javascript and XML) (block 608), so that method users will be able to view the current syndicated content associated with the extension point's updated set of tags, and the process concludes (block 610).

Figure 7:
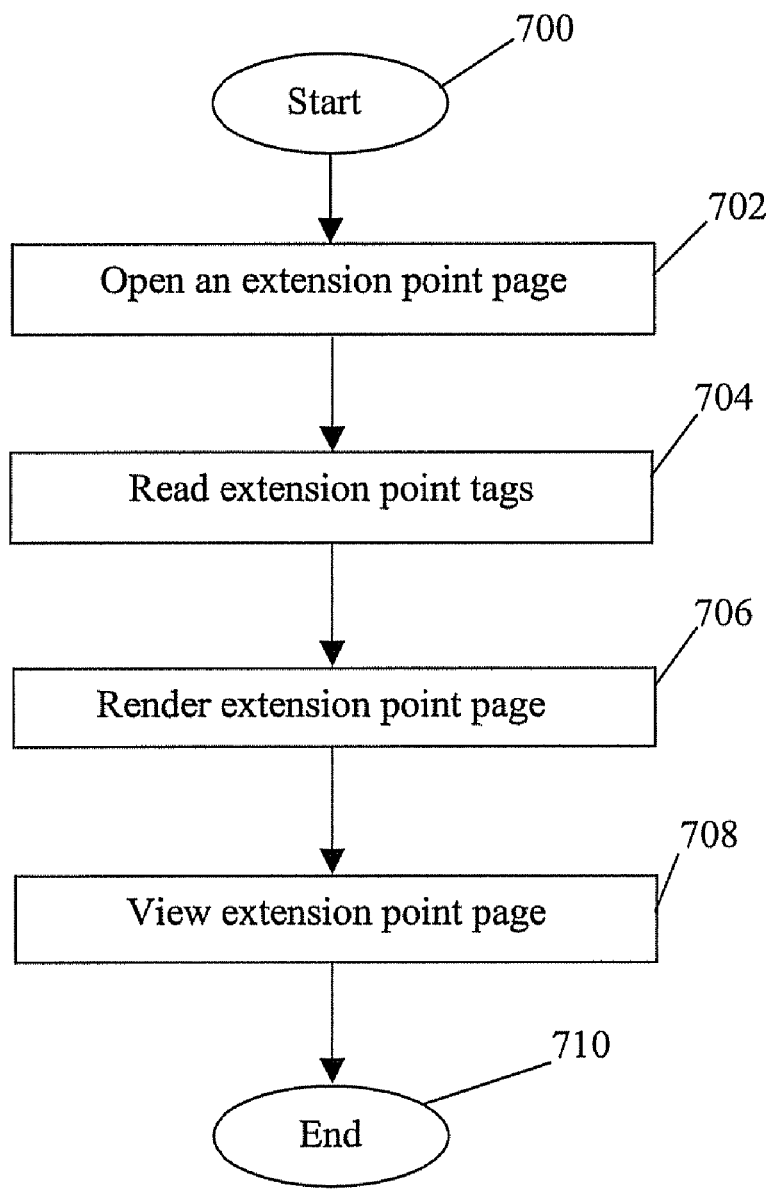
FIG. 7 is a detailed process flowchart viewing an extension point page from a method user's perspective.

FIG. 7 (also see FIG. 3E) is a detailed process flowchart viewing an extension point page from a method user's perspective. The process begins (block 700) with a method user opining an extension point page with a URI (a system generated extension point hyperlink or Uniform Resource Identifier (URI) is then inserted into the customized method (block 908) of FIG. 9) (block 702). The system embodiment reads the extension point tags (block 704). Prior to rendering the page for the user, a web service is called asynchronously (asynchronous calls to a Web service may be achieved through AJAX (Asynchronous Javascript and XML)) to retrieve the latest set of tags for the extension point. Retrieving an extension point's set of tags is achieved by passing in the customized method's identifier and the extension point's identifier to the web service as follows:
readTagsForExtensionPoint(customizedMethodID, extensionPointID): Tag[ ]
where Tag[ ] is a collection of tagging instances returned by the web service. The page programming script renders (displays) the dynamic content associated with the tags returned by the web service in the previous step (block 706). The user is now able to view the page with dynamic content updated with latest set of tags (block 708), and the process concludes (block 710).

Figure 8:
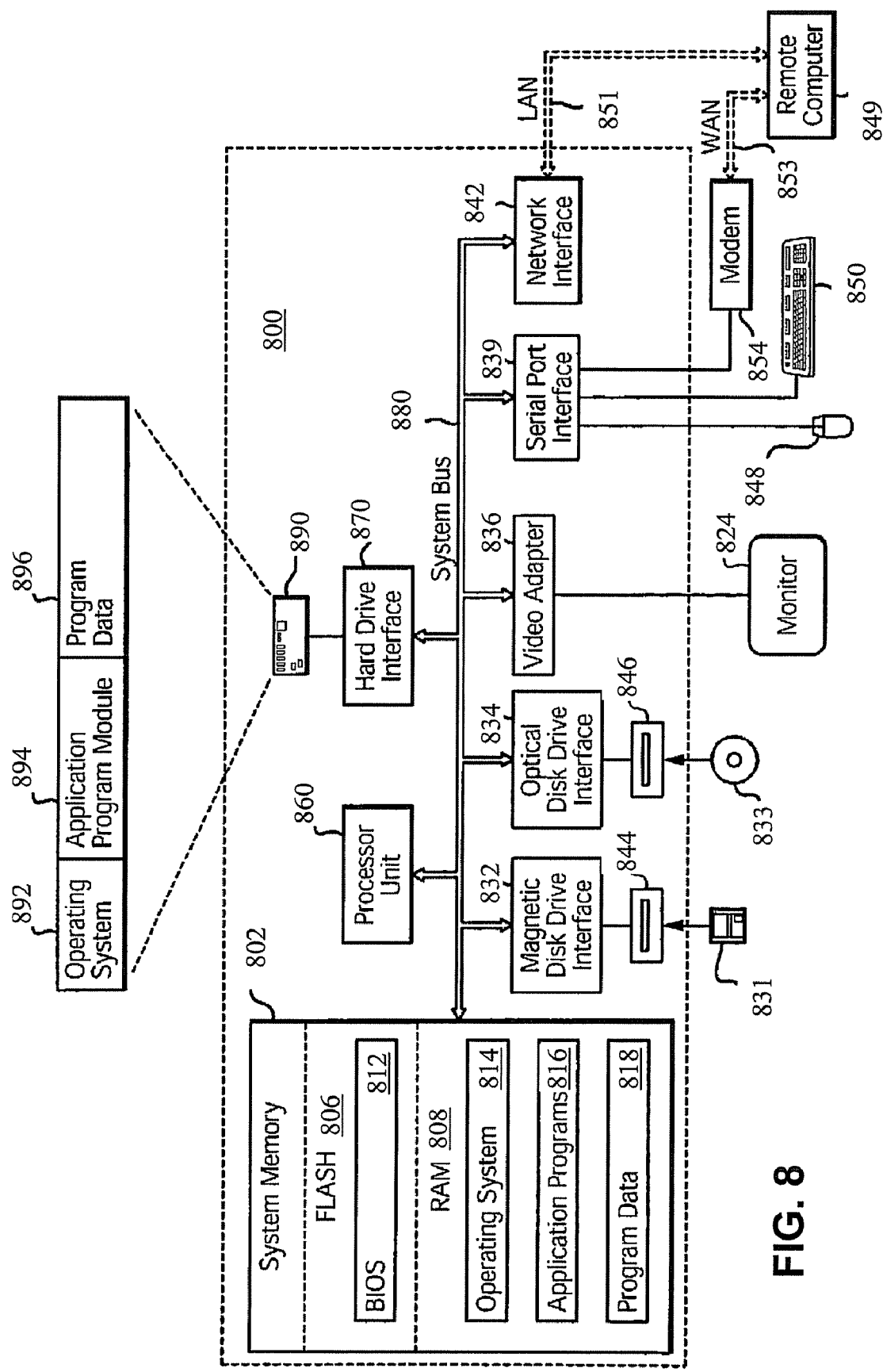
FIG. 8 is a block diagram illustrating an exemplary computer system that may be utilized to implement exemplary embodiments of the invention.

FIG. 8 and the following discussion are intended to provide a general description of an exemplary data processing system that may be adapted to implement exemplary embodiments of the invention. While exemplary embodiments of the invention will be described in the general context of an application program that runs on an operating system in conjunction with a personal computer, those skilled in the art will recognize that exemplary embodiments may also be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

Referring now to FIG. 8, there is depicted an exemplary data processing system 800 that may be utilized to implement exemplary embodiments of the present invention. For discussion purposes, the data processing system is described as having features common to a personal computer, such as a desktop or portable computer. As used herein, however, the terms "data processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, web-enabled televisions, home automation systems, multimedia viewing systems, gaming consoles, etc.).

Data processing system 800, as provided in FIG. 8, is configured as a personal computer that generally includes a processing unit 860, a system memory 802, and a system bus 880 that couples system memory 802 to processing unit 860. The system memory 802 includes flash memory 806 and random access memory (RAM) 808. Flash memory 806 is an electrically erasable programmable read only memory (EEPROM) module that includes a basic input/output system (BIOS) 812. BIOS 812 contains the basic routines that facilitate transfer of information between elements within personal computer 800, such as during start-up.

Data processing system 800 further includes a hard disk drive 890, a magnetic disk drive 844 (which can be used to read from or write to a removable disk 831), and an optical disk drive 846 (which can be used to read a CD-ROM disk 833 or read or write to other optical media). Hard disk drive 890, magnetic disk drive 844, and optical disk drive 836 are electrically communicatively coupled to system bus 880 by a hard disk drive interface 870, a magnetic disk drive interface 832, and an optical drive interface 834, respectively. The drives and their associated computer-readable media provide non-volatile storage for data processing system 800. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives and RAM 808, including an operating system 814, application program modules 816 (such as, for example, word processors, design applications, and IBM's Workplace Forms suite of program modules), and program data 818. A user may enter commands and information into data processing system 800 through a keyboard 890 and a mouse 848. Other input devices (not shown) may include, for example, a microphone, joystick, game pad, satellite dish, scanner, or the like. These and other input devices are often connected to processing unit 860 through a serial port interface 839 that is coupled to system bus 880, but may be connected by other interfaces, such as a game port or a universal serial bus (USB). A monitor 824 or other type of display device is also connected to system bus 880 via an interface, such as a video adapter 836. In addition to the monitor, the exemplary computer operating environment may also include other peripheral output devices (not shown), such as speakers or printers.

Data processing system 800 may operate in a networked environment using logical connections to one or more remote computers, such as a remote computer 849. Remote computer 849 may be, for example, a server, a router, a peer device, or another common network node, and may include many or all of the elements described in relation to data processing system 800. The logical connections depicted in FIG. 8 include a local area network (LAN) 891 and a wide area network (WAN) 893.

When used in a LAN networking environment, data processing system 800 is connected to LAN 891 through a network interface 842. When used in a WAN networking environment, data processing system 800 includes a modem 894 or other means for establishing communications over WAN 893, such as the Internet. Modem 894, which may be internal or external to data processing system 800, is connected to system bus 880 via serial port interface 839. In a networked environment, program modules depicted relative to data processing system 800, or portions thereof, may be stored in the remote memory storage device. It will be appreciated that the network connections shown are exemplary and other means of establishing a communications link between the computers may be used.

Exemplary embodiments of the present invention may be implemented in conjunction with an SOA environment such as, for example, an integrated web services implementation, in which the SOA supports integration and consolidation of any number of services and processes. Web services are self-contained, self-describing, modular applications that may be described, located, and invoked over a computer network such as the World Wide Web. Web services utilize standardized interfaces and protocols (for example, a web Application Programming Interface (API)) to implement consolidation and integration methods that allow different entities or web-based applications to communicate data, logic, and processes with one another over a network. These standardized methods permit different applications to exchange resources with other entities or applications that are running on different operating systems. In an SOA environment, the SOA may define a interface through which a service-requesting or client-side party may access web services or enterprise-based services provided within an enterprise domain, specify or consolidate a set of web services or web service providers that may be invoked through the interface, and define protocols for communicating with the set of web services through the SOA interface.

Figure 9:
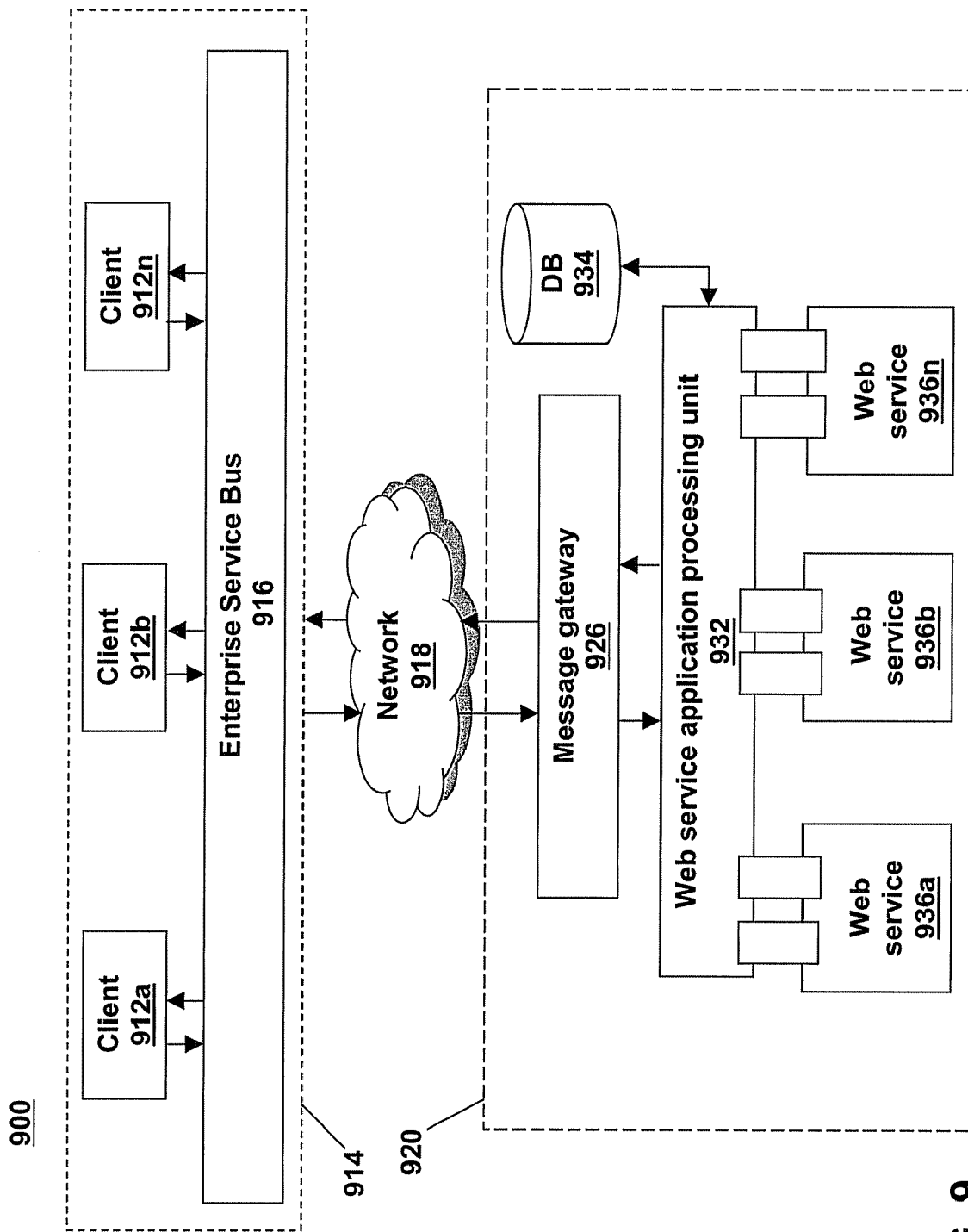
FIG. 9 is a block diagram illustrating an operational configuration of an exemplary embodiment of an SOA web service system according to embodiments of the invention.

FIG. 9 is a block diagram illustrating an exemplary embodiment of an SOA web service system 900 within which exemplary embodiments of the invention may be implemented and operated in a collaborative environment such as that of a business enterprise. Web service system 900 allows for the exchange or transport of web service data or web service messages between multiple client applications (912a, 912b-912n) within an enterprise domain 914 to any of multiple web services (936a, 936b-936n) hosted by a web service application server or provider 920 using an enterprise service bus (ESB) 916. In exemplary embodiments, web service system 900 may allow for the exchange or transport of web service data or web service messages between client applications 912 and a number of web service application providers that each host one or more web services over a communications network 918.

Client applications 912 are software applications that include one or more sequences of instructions that are executable by one or more processors. For example, applications 912 may be programs that are executable on a computer system such as the data processing system illustrated in FIG. 8, described above. Web services 936 may include some combination of programming and data that are made available through application server 920 for end users and other network-connected application programs. In exemplary embodiments, web services 936 may comprise one or more web applications that are implemented to allow users of client applications 912 to communicate therewith to create and store folksonomic tags for describing web content such as, for example, digital images or internet bookmarks.

When a client application needs to invoke a remote web service at application server 920, the invoking client application generates a request message describing arguments to be given to the web services, and requests processing by the web services. Upon receiving the request message, application server 920 performs the processing for the requested web services, and returns a response message describing any return values of the processing to the client application.

ESB 916, which is a component of enterprise domain 914 in the present exemplary embodiment, serves to provide an enhanced messaging middleware infrastructure for the enterprise domain and provides the set of capabilities through which the SOA may be implemented. The capabilities provided by ESB 916 may include, for example, invocation, routing, mediation, messaging, mediation, messaging, process choreography, service orchestration, complex event processing, and management functions. In general, ESB 916 serves as a centralized broker that handles issues relating to security, access, and communication in the SOA environment. In exemplary embodiments, ESB 916 may be configured to perform data integration to ensure that information is kept consistent within the SOA environment, provide a common user interface through which client applications 912 may access the web services that are specified by the SOA, and to extract policies or rules from the specified web services so that if one service is replaced with a different vendor's services in the SOA specification, the business rules do not have to be re-implemented. In alternative exemplary embodiments, ESB 916 may be a vendor-provided service bus that is external to enterprise domain 914.

In one particular exemplary capability, ESB 916 serves as a message mediator by receiving, processing, and passing request messages from client applications 912 and response messages from web services 936 such that the services can be called to perform their tasks in a standard way, without the services having foreknowledge of the calling client applications, and without the client applications having or needing knowledge of how the services actually perform their tasks. In exemplary embodiments, the message processing performed by ESB 916 may be built upon generally accepted web services standards and protocols such as, for example, XML (a markup language for describing data in message payloads in a document format), HTTP (or HTTPS, a request/response protocol between clients and servers used to transfer or convey information), SOAP (a protocol for exchanging XML-based messages over a computer network, normally using HTTP), and XACML (a markup language for expressing access control rules and policies).

ESB 916 and web services 936 communicate with each other, as well as with other applications and web service systems, through network 918. Network 918 is configured to receive and pass on request and response messages accordingly, and to use the transportation protocol or protocols used by messages. Network 918 includes intranets, extranets, and the Internet, and may contain any number of network infrastructure elements including routers, switches, gateways, etc. For example, network 918 may be the public Internet or a private LAN. In exemplary embodiments, ESB 916 may also communicate with other web service providers to provide other web services and applications through network 918 to client applications 912, as well as with enterprise service providers through an intranet within enterprise domain 914 that provide other services and processes such as enterprise legacy services to the client application.

Application server 920 provides web services 936 to client applications 912 through network 918. A web server application processing unit 932 (such as WebSphere®, a product of International Business Machines Corporation) oversees the execution of multiple web services 936a, 936b-936n that reside on application server 920. Network 918 passes each request message to and receives each response message from application processing unit 932 through a message gateway 926 such as, for example, a proxy, firewall, or other message intermediary. Message gateway 926 receives request messages from network 918 and passes response messages to the network. Message gateway 926 performs lexical analysis of request messages to create input objects including parameters for invocation of one or more of web services 936. Message gateway 926 sends input objects to web service application processing unit 932, which calls the appropriate web services that correspond to the method invocation of the input objects, executes the appropriate logic, and returns the result as output objects that include the return values of the invoked web service(s), to the message gateway. Message gateway 926 converts output objects into response messages, and transmits the response messages through network 918 to the invoking client applications.

Application processing unit 932 may also be supported by a database management system 934, which may be any conventional data repository for storing, managing, and retrieving data. In exemplary embodiments, database 934 may be a relational or object-relational database management system, such as DB2, a product of International Business Machines Corporation. In exemplary embodiments, database 934 may be internal to application server 920 (as shown in FIG. 9) or, alternatively, reside externally on a separate machine. In exemplary embodiments, application server 920 may use a single database 934 to serve multiple web services 936 (as shown in FIG. 9) or, alternatively, use a separate database for each separate web service.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for consistently and dynamically mapping and maintaining a customized method set of tags particular to an extension point page, the method comprising:
   extending static customized method content to the extension point page by:
   mapping static customized method content to the extension point page;
   wherein the extension point page is configured with collaborative content and dynamic content;
   filtering the dynamic content based on a set of tags associated with the extension point page;

synchronizing the extension point page's tags to ensure that the dynamic content rendered in the extension point page has a set of updated tags to retrieve current syndicated content;

wherein a method author defines the extension point page in the customized method;

wherein a method user views the extension point page; and wherein in the event a method user encounters an extension point link in the customized method, the method further comprises:

opening an extension point page in response to the method user's selection of the extension point link;

calling a Web service to provide one or more extension point tags for the extension point page;

rendering the extension point page with dynamic content associated with the one or more extension point tags; and wherein the one or more extension point tags are a subset of a set of customized method tags.

2. The method of claim 1, wherein the synchronizing is achieved through an application or Web service that updates a relational database management system (RDBMS).

3. The method of claim 1, wherein a table is configured to map customized method tags from the set of customized method tags to create the one or more extension point tags;

wherein the table is configured with a series of tags that serve as soft references to the customized method tags; and wherein the method author maintains the table.

4. The method of claim 3, wherein a Web service is built around the table to create, read, update, and delete (CRUD) the series of tags;

wherein the web service is called from within the extension point page; and wherein the series of tags are used in really simple syndication (RSS) calls to one or more informational silos that contain the dynamic content.

5. The method of claim 1, wherein the dynamic content comprises at least one of bookmark services, reusable assets from an asset repository, media rich content, educational content, social software services, blogs, and wilds.

6. The method of claim 1, wherein a service oriented architecture (SOA) is utilized for implementing the method.

7. An article comprising one or more computer-readable storage media containing instructions that when executed by a computer enables consistent and dynamic mapping and maintenance of a customized method set of tags particular to an extension point page, wherein the method further comprises:

extending static customized method content to the extension point page by:

mapping static customized method content to the extension point page;

wherein the extension point page is configured with collaborative content and dynamic content;

filtering the dynamic content based on a set of tags associated with the extension point page;

synchronizing the extension point page's tags to ensure that the dynamic content rendered in the extension point page has a set of updated tags to retrieve current syndicated content;

wherein a method author defines the extension point page in the customized method; and wherein in the event a method user encounters an extension point link in the customized method, the method further comprises:

wherein a method user views the extension point page opening an extension point page in response to the method user's selection of the extension point link;

calling a Web service to provide one or more extension point tags for the extension point page;

rendering the extension point page with dynamic content associated with the one or more extension point tags; and wherein the one or more extension point tags are a subset of a set of customized method tags.

8. The article of claim 7, wherein the synchronizing is achieved through an application or Web service that updates a relational database management system (RDBMS).

9. The article of claim 7, wherein a table is configured to map customized method tags from the set of customized method tags to create the one or more extension point tags;

wherein the table is configured with a series of tags that serve as soft references to the customized method tags; and wherein the method author maintains the table.

10. The article of claim 9, wherein a Web service is built around the table to create, read, update, and delete (CRUD) the series of tags;

wherein the web service is called from within the extension point page; and wherein the series of tags are used in really simple syndication (RSS) calls to one or more informational silos that contain the dynamic content.

11. The article of claim 7, wherein the dynamic content comprises at least one of bookmark services, reusable assets from an asset repository, media rich content, educational content, social software services, blogs, and wilds.

12. The article of claim 7, wherein a service oriented architecture (SOA) is utilized for implementing the method.

13. A system for consistent and dynamic mapping and maintenance of a customized method set of tags particular to an extension point page, the system comprising:

one or more server devices in communication with one or more client devices through a network;

the server devices and the client devices configured to execute electronic software;

wherein the electronic software is resident on storage mediums in signal communication with the client and server devices;

wherein the electronic software comprises a series of instructions configured for:

extending static customized method content to the extension point page by:

mapping static customized method content to the extension point page;

wherein the extension point page is configured with collaborative content and dynamic content;

filtering the dynamic content based on a set of tags associated with the extension point page;

synchronizing the extension point page's tags to ensure that the dynamic content rendered in the extension point page has a set of updated tags to retrieve current syndicated content;

wherein a method author defines the extension point page in the customized method;

wherein a method user views the extension point page; and wherein in the event a method user encounters an extension point link in the customized method, the series of instructions further comprise:

opening an extension point page in response to the method user's selection of the extension point link;

calling a Web service to provide one or more extension point tags for the extension point page;

rendering the extension point page with dynamic content associated with the one or more extension point tags; and wherein the one or more extension point tags are a subset of a set of customized method tags.

14. The system of claim 13, wherein the synchronizing is achieved through an application or Web service that updates a relational database management system (RDBMS).

15. The system of claim 13, wherein a table is configured to map customized method tags from the set of customized method tags to create the one or more extension point tags;

wherein the table is configured with a series of tags that serve as soft references to the customized method tags;

wherein the method author maintains the table.

16. The system of claim 15, wherein a Web service is built around the table to create, read, update, and delete (CRUD) the series of tags;

wherein the web service is called from within the extension point page; and wherein the series of tags are used in really simple syndication (RSS) calls to one or more informational silos that contain the dynamic content.

17. The system of claim 13, wherein the dynamic content comprises at least one of: bookmark services, reusable assets from an asset repository, media rich content, educational content, social software services, blogs, and wilds.

* * * * *